United States Patent
Fukushima et al.

(10) Patent No.: US 6,295,086 B1
(45) Date of Patent: *Sep. 25, 2001

(54) APPARATUS AND METHOD FOR GENERATING DIGITAL STILL IMAGE FILES FROM DIGITAL MOVING IMAGES

(75) Inventors: Shinichi Fukushima, Kanagawa; Junichi Tsukamoto, Tokyo; Nobuaki Izumi, Chiba, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,579

(22) Filed: Apr. 21, 1997

(30) Foreign Application Priority Data

Apr. 24, 1996 (JP) ................................ 8-126287

(51) Int. Cl.⁷ .................... H04N 5/76; H04N 5/781; H04N 5/85; H04N 5/90
(52) U.S. Cl. ....................... 348/231; 386/125; 348/232
(58) Field of Search ................. 348/231, 232, 348/233, 220, 222; 386/45, 4, 69, 70, 52, 64, 125, 126, 95; 345/328

(56) References Cited

U.S. PATENT DOCUMENTS

| | | | |
|---|---|---|---|
| 4,430,675 | 2/1984 | Fujime | 358/342 |
| 4,903,132 | 2/1990 | Yamawaki | 358/209 |
| 5,301,240 | * 4/1994 | Stockum et al. | 382/1 |
| 5,392,071 | * 2/1995 | Richards et al. | 348/398 |
| 5,475,441 | * 12/1995 | Parulski et al. | 348/552 |
| 5,517,320 | * 5/1996 | Schuler | 358/335 |
| 5,585,845 | * 12/1996 | Kawamura et al. | 348/231 |
| 5,633,678 | * 5/1997 | Parulski et al. | 348/232 |
| 5,806,072 | * 9/1998 | Kuba et al. | 707/200 |
| 5,966,496 | * 10/1999 | Takimoto | 386/95 |
| 6,101,292 | * 8/2000 | Udagawa et al. | 382/299 |

* cited by examiner

*Primary Examiner*—Wendy R. Garber
*Assistant Examiner*—Alicia Harrington
(74) *Attorney, Agent, or Firm*—Frommer Lawrence & Haug LLP; William S. Frommer; Glenn F. Savit

(57) ABSTRACT

To capture digital moving image information supplied from a digital VTR and to generate high quality still image data files, a programmable controller executes program instructions to determine whether an image capturing operation has been activated and to determine whether the extracted frame is valid/appropriate. If so, a header is appended, based on various video transmission standards such as NTSC or PAL, to the extracted frame data, thereby generating an image file. The frame data following this header is then recorded to the recording medium, such as a disk, for subsequent signal processing by the programmable controller.

13 Claims, 13 Drawing Sheets

| Offset | Contents | |
|---|---|---|
| 00-03H | file identifier | A11 |
| 04-07H | file version | A12 |
| 08-0AH | detailed format information | A13 |
| 0BH | data attributes | A14 |
| 0C-0FH | file size | A15 |
| 10-13H | data size | A16 |
| 14-17H | data offset | A17 |
| 18-1FH | (Reserved) | A18 |

1 block (80 bytes)

SC ····· Sub Code
VA ····· VAUX
Au ····· Audio
Vi ····· Video
H ····· Header (during VTR output)

audio block

FIG. 6A  Data Type (3bit)

000 : Header

001 : SubCode

010 : VAUX

011 : Audio

100 : Video 101  
110  } reserved  
111

FIG. 6B  Sub-Sequence No. (4bit)

(=Track No.)

NTSC : 0 ~ 9

PAL : 0 ~ 11

FIG. 6C  DIF Block No. (8bit)

Header : 0

Sub Code : 0 ~ 1

VAUX : 0 ~ 2

Audio : 0 ~ 8

Video : 0 ~ 134

FIG. 7A packets

| | | | | | | |
|---|---|---|---|---|---|---|
| 0 | H0 | SC0 | SC1 | VA0 | VA1 | VA2 |
| 1 | Au0 | Vi0 | Vi1 | Vi2 | Vi3 | Vi4 |
| ⋮ | | | ⋮ | | | |
| 23 | V123 | V124 | V125 | V126 | V127 | V128 |
| 24 | V129 | V130 | V131 | V132 | V133 | V134 |
| 25 | H0 | SC0 | SC1 | VA0 | VA1 | VA2 |
| ⋮ | | | ⋮ | | | |
| 49 | V129 | V130 | V131 | V132 | V133 | V134 |
| ⋮ | | | ⋮ | | | |
| 225 | H0 | SC0 | SC1 | VA0 | VA1 | VA2 |
| ⋮ | | | ⋮ | | | |
| 249 | V129 | V130 | V131 | V132 | V133 | V134 |

Track 0 (Sub-Sequence No.0)
Track 1 (Sub-Sequence No.1)
Track 9 (Sub-Sequence No.9)

$H_0$ : Header DIF block
$SC_i$ : Subcode DIF block$i$      ( $i = 0, 1$ )
$VA_i$ : VAUX DIF block$i$      ( $i = 0, 1, 2$ )
$A_i$ : Audio DIF block$i$      ( $i = 0 \cdots 8$ )
$V_i$ : Video DIF block$i$      ( $i = 0 \cdots 132$ )

FIG. 7B packets

| | | | | | | |
|---|---|---|---|---|---|---|
| 0 | H0 | SC0 | SC1 | VA0 | VA1 | VA2 |
| 1 | Au0 | Vi0 | Vi1 | Vi2 | Vi3 | Vi4 |
| ⋮ | | | ⋮ | | | |
| 23 | V123 | V124 | V125 | V126 | V127 | V128 |
| 24 | V129 | V130 | V131 | V132 | V133 | V134 |
| 25 | H0 | SC0 | SC1 | VA0 | VA1 | VA2 |
| ⋮ | | | ⋮ | | | |
| 49 | V129 | V130 | V131 | V132 | V133 | V134 |
| ⋮ | | | ⋮ | | | |
| 225 | H0 | SC0 | SC1 | VA0 | VA1 | VA2 |
| 249 | V129 | V130 | V131 | V132 | V133 | V134 |

Track 0 (Sub-Sequence No.0)
Track 1 (Sub-Sequence No.1)
Track 11 (Sub-Sequence No.11)

$H_0$ : Header DIF block
$SC_i$ : Subcode DIF block$i$      ( $i = 0, 1$ )
$VA_i$ : VAUX DIF block$i$      ( $i = 0, 1, 2$ )
$A_i$ : Audio DIF block$i$      ( $i = 0 \cdots 8$ )
$V_i$ : Vidio DIF block$i$      ( $i = 0 \cdots 134$ )

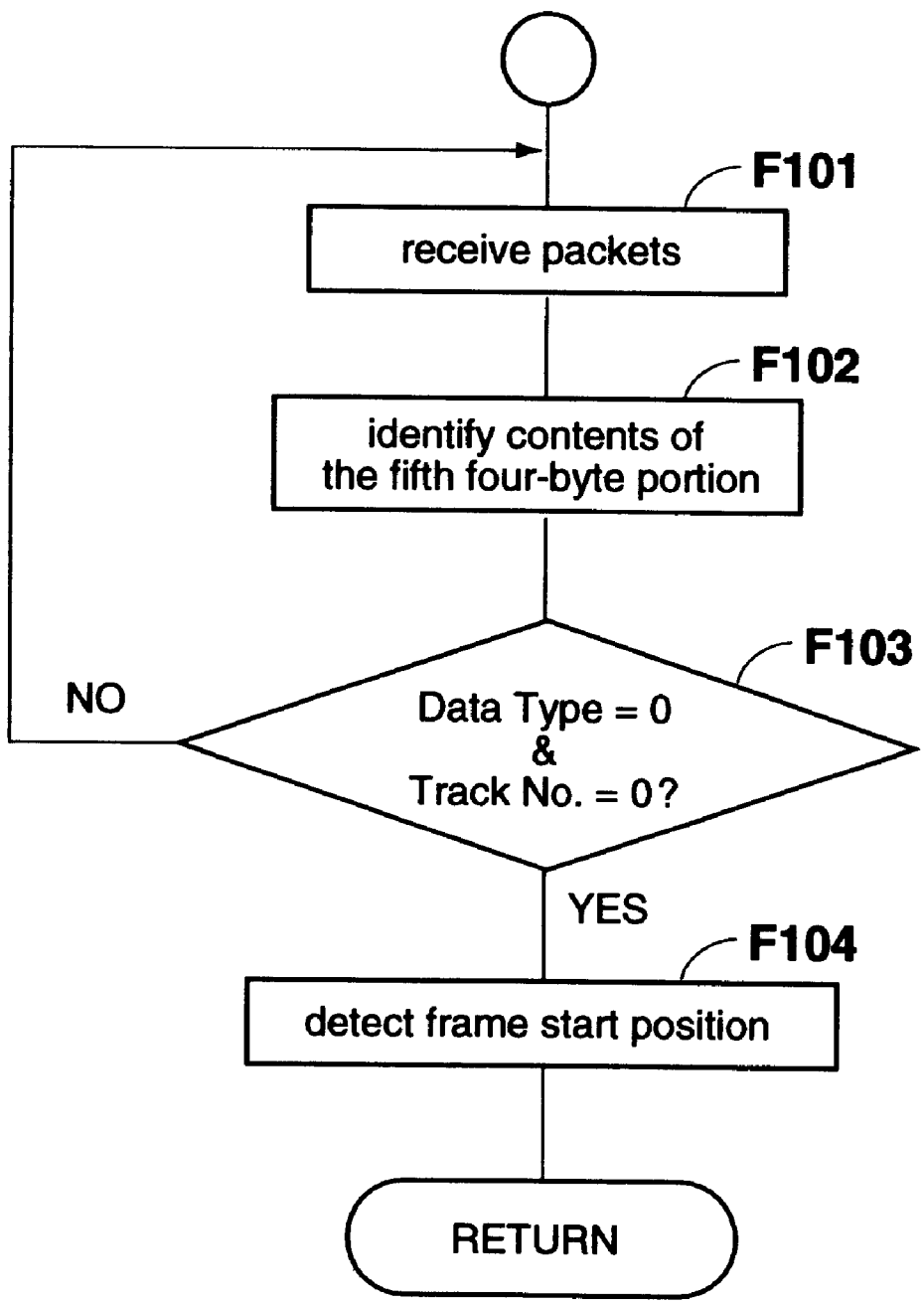

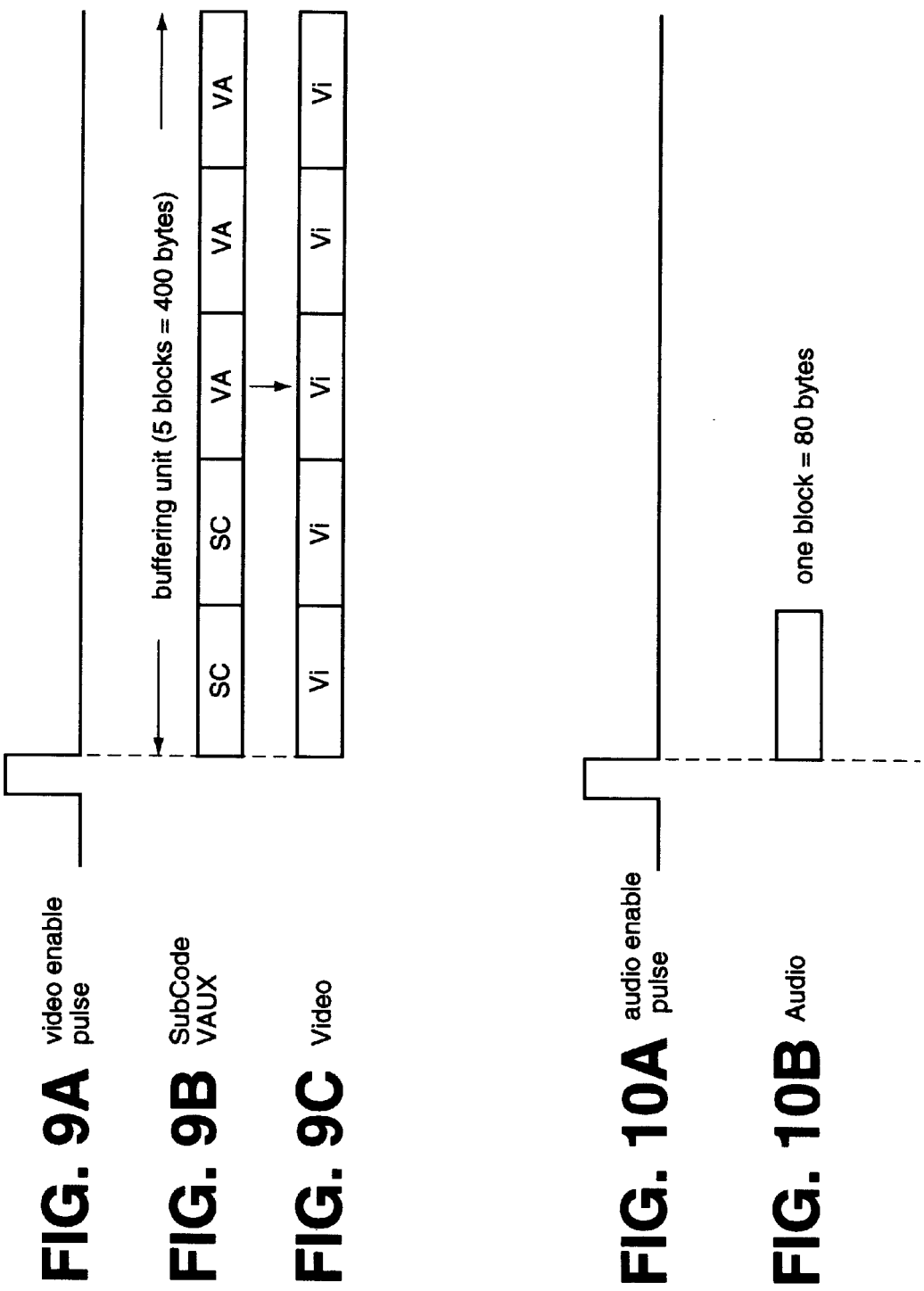

FIG. 11A

| | |
|---|---|
| header (32 bytes) | — A1 |
| data | — A2 |

FIG. 11B

| Offset | Contens | |
|---|---|---|
| 00-03H | file identifier | — A11 |
| 04-07H | file version | — A12 |
| 08-0AH | detailed format information | — A13 |
| 0BH | data attributes | — A14 |
| 0C-0FH | file size | — A15 |
| 10-13H | data size | — A16 |
| 14-17H | data offset | — A17 |
| 18-1FH | (Reserved) | — A18 | detailed format information (three bytes of ASCII code)

| format | code |
|--------|------|
| SD525  | " SD5 " |
| SD625  | " SD6 " |
| SDL525 | " SL5 " |
| SDL625 | " SL6 " |
| HD1125 | " H11 " |
| HD1250 | " H12 " | data attributes file size (straight binary, four bytes)

| format | data size |
|--------|-----------|
| SD525  | 0001D1C0H  (=119232 bytes) |
| SD625  | 00022EE0H  (=143072 bytes) | data size (straight binary, four bytes)

| format | data size |
|--------|-----------|
| SD525  | 0001D1A0H  (=119200 bytes) |
| SD625  | 00022EC0H  (=143040 bytes) |

APPARATUS AND METHOD FOR GENERATING DIGITAL STILL IMAGE FILES FROM DIGITAL MOVING IMAGES

BACKGROUND OF THE INVENTION

The present invention is related to image processing and, in particular, to an apparatus and method for recording digital still images on a data storage medium (e.g., a floppy disk) based on moving images reproduced from a digital VTR (Video Tape Recorder), for example.

In recent years, microprocessor-controlled devices, such as personal computers, have become very popular and widespread around the world. A personal computer may, for example, be used for displaying image data, captured from an outside source (a video camera), on a monitor device connected to the computer. Various processing operations may then be performed on the captured image data utilizing image processing software, for example.

Further, household use of digital VTRs (including digital camcorders) capable of recording and playing back moving picture image information has become widespread. The digital VTRs are capable of obtaining higher quality pictures than analog VTRs, that is VTRs for recording and reproducing analog image signals. Hence, it appears logical that an image obtained and/or played back by a digital video camera/digital VTR be captured by a computer and processed for various types of recreational or business use.

An obstacle, however, exists in such processing of images produced by the digital VTR. Namely, when an image reproduced from the digital VTR is supplied to the computer, the digital image signal has to be converted to an analog image signal. This analog image signal is then converted back to the digital form by the computer, and an image file is created in accordance with the appropriate video signal format. The thus obtained image file is recorded and stored on a recording medium, such as a hard disk or a floppy disk.

The reason for performing these seemingly unnecessary transformations (from digital to analog and back to digital domains) is as follows: the digital VTR records/reproduces the digital image using a special recording/reproducing format that is not compatible with display/manipulation of the digital images (in units of picture frames, for example) by the computer. Hence, the image represented by a digital signal is typically converted to an analog signal (represented as picture frames) to be captured by the computer prior to its processing operations. It is apparent that these conversions between analog and digital domains negatively affect picture quality.

OBJECTS OF THE INVENTION

It is an object of the present invention to capture digital still images from digital moving images.

It is another object of the present invention to generate data files containing digital still images.

It is yet another object of the present invention to record data files containing digital still images on a recording medium.

It is still another object of the present invention to reproduce data from data files containing digital still images.

It is a further object of the present invention to provide a data structure for still images stored in data files that are recorded on a recording medium.

SUMMARY OF THE INVENTION

These and other objects, features and advantages are accomplished by an apparatus and method for processing digital moving image data. In accordance with the present invention, a still image, represented by frame data, is extracted from the digital moving image data. A data file corresponding to the still image is then generated. The data file includes the extracted frame data and file management data corresponding to the extracted frame data.

In accordance with one aspect of the present invention, the file management data includes at least one of the following: file identification information for identifying the data file; file version information for indicating the data file version; detailed format information for indicating a data format of the digital moving image data; data attribute information for specifying preselected data attributes; file size information for indicating the entire data file length; data size information for indicating the length of the extracted frame data in the data file; and data offset information for indicating the length of the file management data.

In accordance with another aspect of the present invention, images represented by digital signals are recorded/reproduced according to a preselected video format, wherein these digital signals correspond to the digital moving image data.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which:

FIGS. 6A–6C show how the contents of the DIF ID block portion are defined;

FIG. 7A shows a data structure of one frame transmitted according to the NTSC standard;

FIG. 7B shows a data structure of one frame transmitted according to the PAL standard;

FIG. 8 is a flowchart for detecting a frame start position by a board controller;

FIGS. 9A–9C illustrate the block data processed by the image capturing board;

FIGS. 10A–10B illustrate the audio block data processed by the image capturing board;

FIGS. 11A–11B show an image file data structure;

In all Figures, like reference numerals represent the same or identical components of the present invention.

DETAILED DESCRIPTION OF THE PREFERRED EMBODIMENTS

The following description of one embodiment of the present invention (with reference to FIGS. 1–13) will be carried out in the following order:

1. Configuration of an image capturing system according to the present invention.

2. Configuration of an image capturing board in the image capturing system of the present invention.

3. Image capturing operation.

4. Format of digital image data supplied from the digital VTR.

5. Format of a still image file.

6. Generation of the still image file.

7. Display of an image represented by data in the still image file.

1. Configuration of an Image Capturing System According to the Present Invention.

Figure 1:
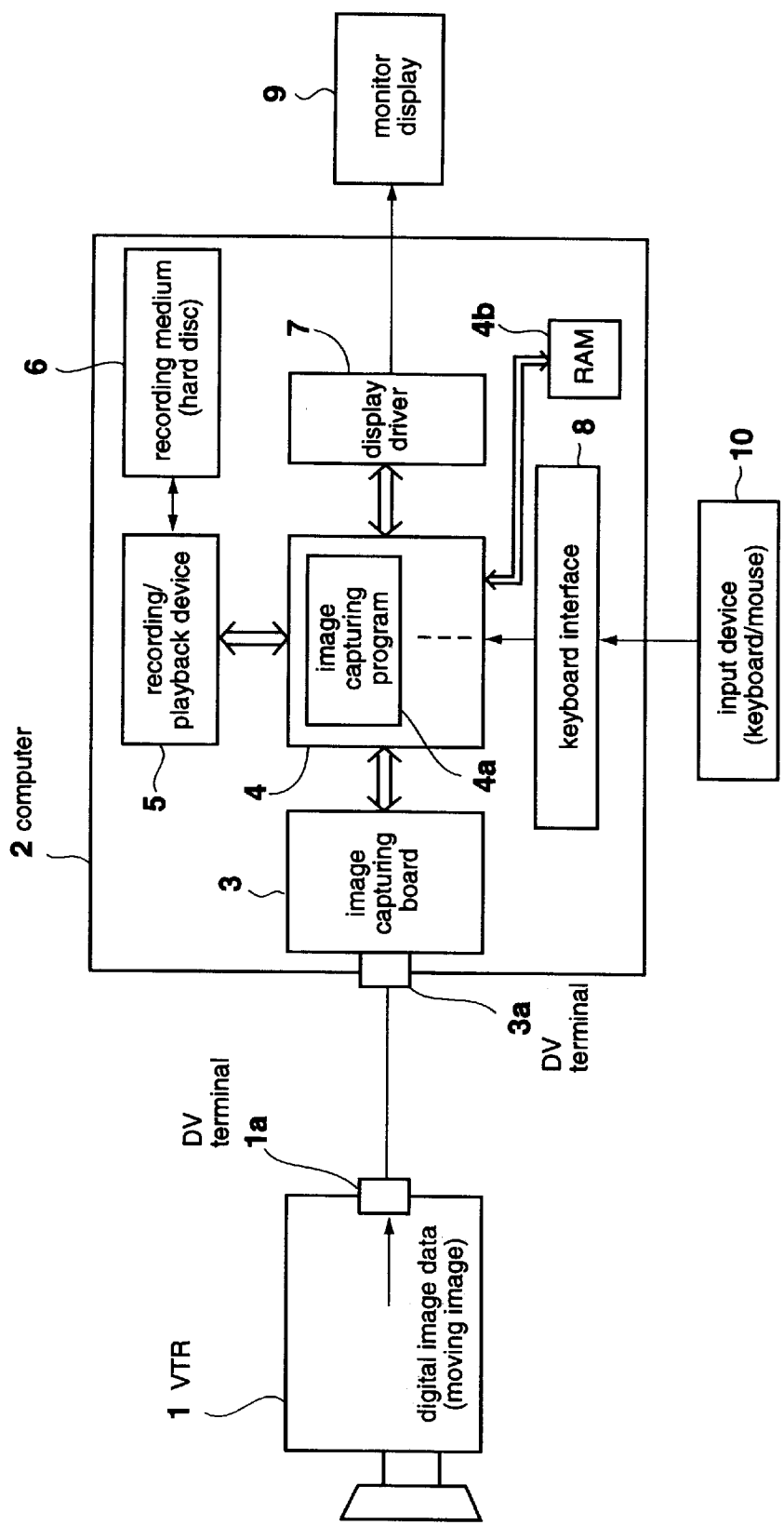
FIG. 1 is a block diagram of an image processing system according to the present invention.

FIG. 1 is a block diagram showing an exemplary configuration of the image capturing system of the present invention. A microprocessor-controlled system includes a general purpose computer 2 for receiving and processing digital images and a monitor 9, connected to the computer 2, for displaying the processed digital images.

Further shown in FIG. 1 is the digital VTR 1 which includes a digital camcorder for recording images on a recording medium (a tape) as a moving image digital signal. The digital VTR 1 can also output image information reproduced from the tape or directly captured by the camera portion of the VTR 1. The output image information is a digital signal supplied to the computer 2 via a direct digital image signal output terminal 1a (hereinafter referred to as a "DV terminal"). The format of the image data generated by the digital VTR 1 will be explained later in the description.

The computer 2 captures at least a still image from the image data supplied by the digital VTR 1, and creates a still image file for displaying the image on the monitor 9.

The computer 2 is equipped with an image capturing board 3 which is configured to capture the image data supplied by the digital VTR 1. The image capturing board 3 is provided with a DV terminal 3a, such that the image data from the digital VTR 1 is supplied via this terminal. Namely, the digital moving image data can be directly transferred to the computer 2 via the DV terminal 3a. For example, an IEEE 1394 digital serial bus may be adopted as the network standard for transferring data between the digital VTR 1 and the computer 2.

Further shown in FIG. 1 is a programmable controller 4 for controlling various operations of the computer 2. An image capturing program 4a is stored in a data storage area of the controller 4: the program 4a instructions are executed by the controller 4, thereby causing the image capture operation to be carried out by the image capturing board 3. A Random Access Memory (RAM) 4b stores data in connection with the execution of instructions by the controller 4. It will be appreciated that the image capturing board 3 and the image capturing program 4a may be available in combination (as a set, for example).

FIG. 1 also shows a recording/playback device 5 for controlling reading/writing operations for each of the image files to/from a recording medium 6. In one particular embodiment, an internal disk drive is used as the recording/playback device 5; however, other driver devices may be used for recording/reproducing information on a hard disk, a floppy disk or other storage media.

In accordance with operating instructions of the controller 4, a display driver 7 converts the picture information from the image files to an RGB signal, for example. The monitor 9 then displays images based on the RGB signal supplied from the display driver 7.

According to one aspect of the present invention, an input device 10 (e.g., a keyboard, a mouse, etc.) is connected to the computer 2 such that commands from the user-manipulated input device 10 are supplied to the controller 4 via a keyboard interface 8. An appropriate processing operation is then executed in accordance with the operational commands entered at the input device 10.

2. Configuration of an Image Capturing Board in the Image Capturing System of the Present Invention.

Figure 2:
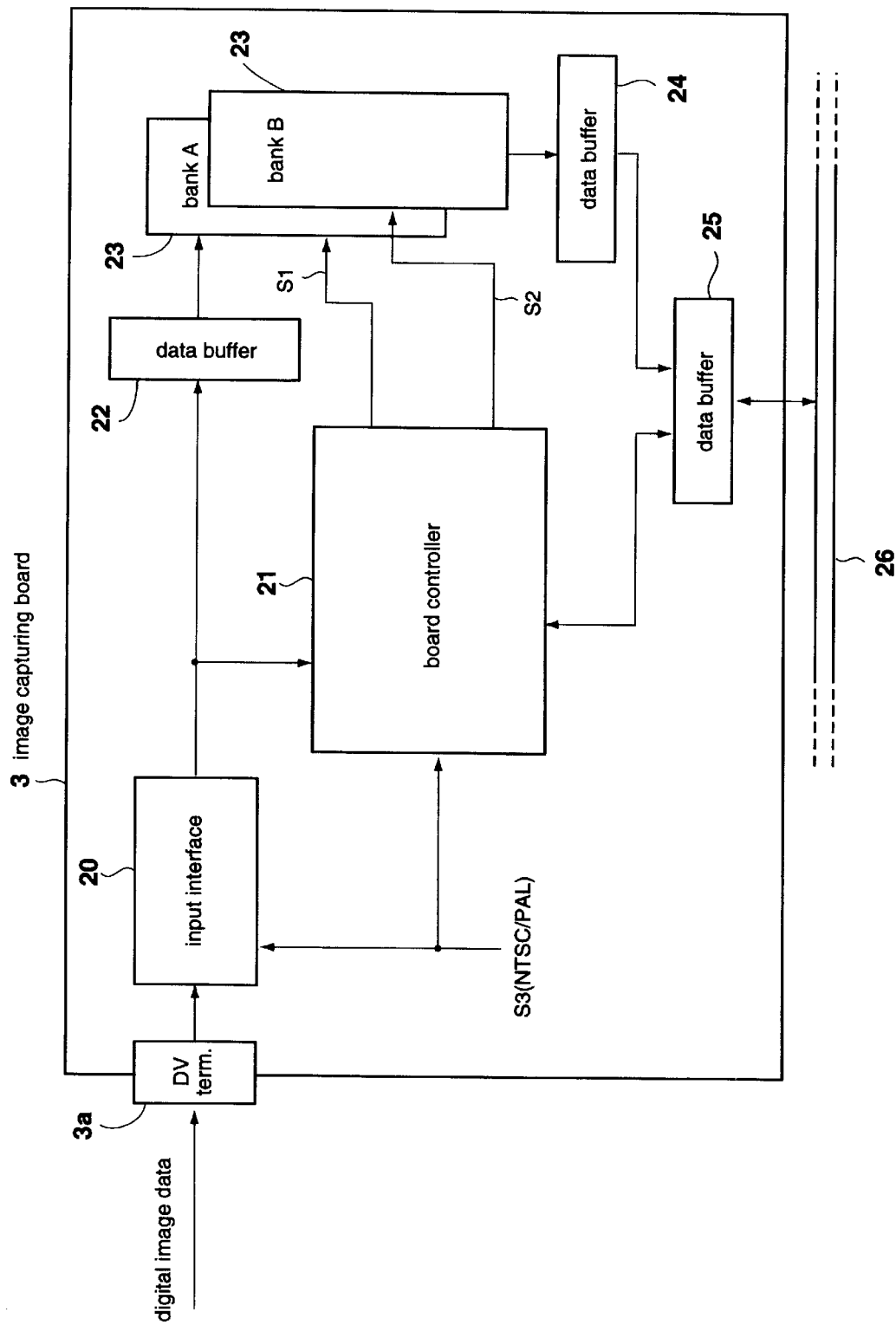
FIG. 2 is a block diagram of an image capturing board in the image processing system.

FIG. 2 is a detailed block diagram of a representative configuration of the image capturing board 3. As shown in FIG. 2, the image capturing board 3 includes the DV terminal 3a, an input interface 20, a board controller 21, data buffers 22, 24, a frame memory 23 and a data bus buffer 25.

The digital image data (moving images from the VTR 1) is supplied to the input interface 20 via the DV terminal 3a. At the input interface 20, the digital image data is converted to a data transfer rate and data structure for use by the board controller 21 and by the data buffer 22. Among other things, the board controller 21 determines the frame start position and image data identification (isochronous transmission or multicast transmission) with respect to the IEEE 1394 standard based on the image data synchronization and control information provided by an information signal S3 (NTSC/PAL). Supplied to the board controller 21, the information signal S3 (indicating whether the NTSC or PAL standard is used in the image data, for example) is also used for controlling writing/reading the image data to/from the frame memory 23.

The frame memory 23 stores digital image data transmitted from the data buffer 22 in frames. The frame memory 23 has two storage areas, a bank A and a bank B, each capable of storing image data in units of frame. Further, the writing of frames to the banks A, B is carried out alternately. The reading of frames is also carried out alternately with respect to the banks A, B so as to become the opposite operation with respect to write cycles. For example, the reading operation of frame data stored in the bank B takes place while new frame data is written to the bank A. Then, during the next cycle, new frame data is written to the bank B at the same time when the data from the bank A is read. This reading/writing process, alternately repeated until instructed otherwise, is controlled by the board controller 21 supplying memory control signals S1 and S2 to the bank A and bank B, respectively.

According to one aspect of the present invention, the image data format is defined based on at least the NTSC standard and the PAL standard. As previously stated, the information signal S3 indicating whether the image data is in the NTSC standard or in the PAL standard is supplied to the input interface 20 and the board controller 21. For example, a signal capable of identifying both formats can be obtained by changing a jumper line connection for a preselected circuit part in one embodiment of the present invention. However, the present invention is by no means limited in. this respect, and the format can be, for example, determined by carrying out identification based on information included in the image data. Alternatively, user-operated changes may be performed by the image capturing control program.

In any event, the board controller 21 and the input interface 20 carry out the required data processing and reading/writing operations from/to the frame memory 23 in accordance with the respective NTSC and PAL standards based on the inputted information signal S3. Frame data retrieved from the frame memory 23 is transmitted to the data bus buffer 25 via the data buffer 24. Image data (in frames) is then transmitted to the controller 4 (FIG. 1) via the bus line 26 with which the image capturing board 3 is communicatively coupled. In accordance with the instructions of the image capturing program 4*a* executed by the controller 4, still image files are generated based on the transmitted image data.

3. Image Capturing Operation.

Next, representative user operations for capturing a still image from the moving images will be described with reference to FIG. 1. Initially, the user connects the computer 2 (having the image capturing board 3) and the digital VTR 1 via a cable, etc., between DV terminals 1*a* and 3*a*. The image capturing program 4*a* is then activated by operating a particular input key of the input device 10 so that the image capturing operation is initiated. When the user causes the playback operation of the digital VTR 1 to start in this manner, the played-back image information is supplied to the computer 2 as a digital signal via the DV terminals 1*a* and 3*a*.

Figure 3:
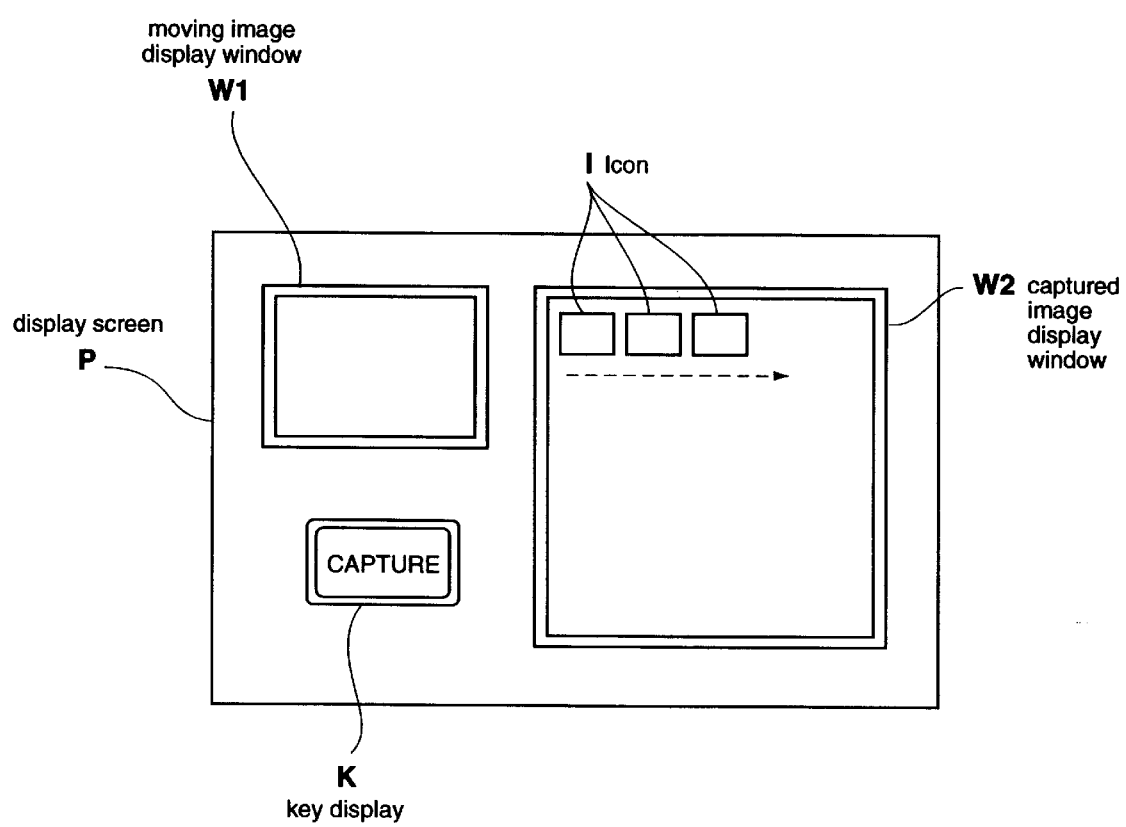
FIG. 3 is an illustration of a display screen of a monitor during a representative image processing operation according to the present invention.

FIG. 3 shows the display screen for the image capturing operation displayed on the monitor 9 while the image capturing program 4*a* is running. For example, when the playback operation of the digital VTR 1 is initiated as described above, the image capturing program 4*a* generates display image information for a candidate frame of the transmitted image data to be captured as a still image. The display image information is displayed in an image display window W1 in the upper right-hand corner of the display region as shown in FIG. 3. That is, the image currently being played back by the digital VTR 1 is displayed in the image display window W1 as a moving image. When the desired scene is to be captured, the image is designated as such by the user while viewing the image display window W1. For example, a cursor (not shown in the figure) may be positioned on an image capturing key display K for image capturing use, and then a mouse button for selecting the desired image is clicked. When this is done, the image capturing program 4*a* captures the frame image displayed in the image display window W1 for which the above operation had been carried out. As a result, the still image file is created, and the data for this file data is stored to the recording medium 6.

A captured image display window W2 is provided so that the user can distinguish between various still image files. Namely, an image file icon I, used in selecting the still image files, is displayed according to the sequential (or random, if preferred) capturing operation of images, for example.

4. Format of Digital Image Data Supplied from the Digital VTR.

According to one embodiment of the present invention, image data based on the recording formats of the digital VTR 1 is captured as still image data by the computer 2. The format of the digital data outputted by the digital VTR 1 and the image capturing board 3 operation corresponding to this format is described with reference to FIGS. 4A–8.

It is worth noting that the image data recorded by the digital VTR 1 may be image/audio data compressed in accordance with Discrete Cosine Transform (DCT) operation. Similarly, the image information data transmitted according to the IEEE 1394 standard via the DV terminal 1*a* may also be based on the recording format of the digital VTR 1.

Figure 4A:
FIG. 4A illustrates a data structure of one track of image data.

FIG. 4A shows a typical data configuration of a single track data portion on the magnetic tape corresponding to the compressed image data played back at the digital VTR 1. The individual data units shown by the solid lines in FIG. 4A are referred to as blocks, wherein one block is 80 bytes. One track portion of the playback data has 149 blocks as indicated by the solid block lines. The leading block (header H) is shown by the dashed lines and is appended to the track data.

Disregarding for now the header block H, 5 blocks of the uppermost row are arranged from left to right in the horizontal direction. Then, in the same direction, 16 blocks are arranged from left to right from the second row onwards. To reiterate, the playback data output from the DV terminal 1*a* of the digital VTR 1 conforms to this block arrangement, as shown in FIG. 4A.

A Sub Code (SC) block, a VAUX (VA) block, an Audio (Au) block and a Video (Vi) block are types of data blocks recorded on the tracks. Data such as time codes, etc., is recorded in the Sub Code block, and various management and information data relating to the image signal may be found in the VAUX block.

Figure 4B:
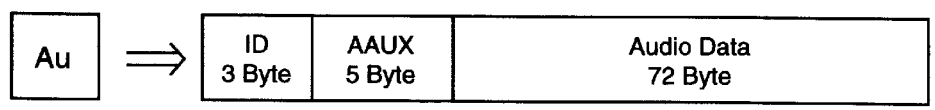
FIG. 4B illustrates a data structure of one audio block recorded on the track.

FIG. 4B shows the Audio block configuration including an AAUX area (5 bytes) and an Audio Data area (72 bytes) following the leading ID area (3 bytes). Similar to the VAUX data, the AAUX data contains various management information relating to the audio signal.

Further, at least two types of formats, such as the SD525, based on the NTSC standard, and the SD625 format, based on the PAL standard, are defined as the recording formats for the digital VTR 1. In the case of the SD525 format, one frame contains 10 tracks, and in the SD625 format, one frame has 12 tracks recorded on the magnetic tape. The data size for one frame portion in the SD525 format, therefore, becomes:

80(bytes/block)*149(blocks/track)*10(tracks)=119200 bytes

The data size for one frame portion in the SD625 format is:

80(bytes/block)*149(blocks/track)*12(tracks)=143040 bytes.

When the image data is output from the DV terminal 1*a*, a header block H based on the IEEE 1394 standard is added to the start of track data, as shown in FIG. 4A. Hence, when the playback image data is supplied by the VTR 1, data comprising 149+1=150 blocks is transmitted for one track data portion.

Figure 5A:
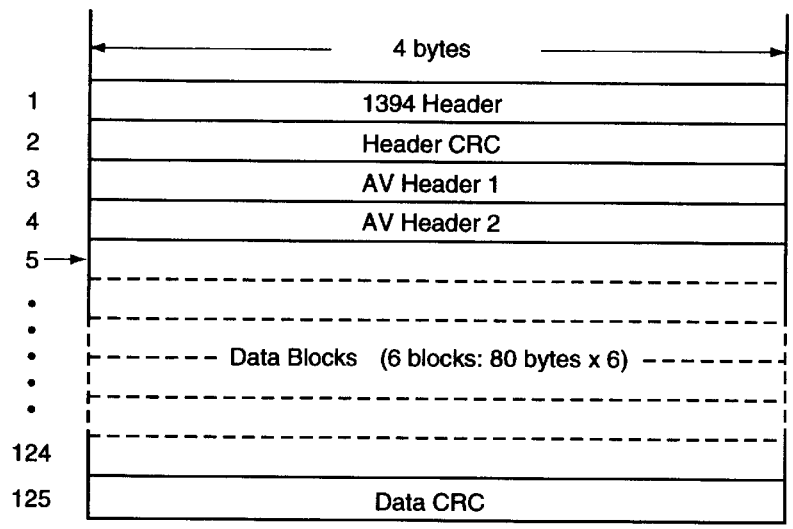
FIG. 5A illustrates a data structure of one transmission packet.

FIG. 5A shows a representative packet data configuration. Transmission via the DV terminal is carried out in packets. A packet consists of 125 four-byte data portions as shown in FIG. 5A, and the data size of each packet is, therefore:

4 (bytes)×125=500 bytes.

The leading four bytes of the packet are as follows: a 1394 header shows whether the transmission is based on the IEEE 1394 standard; the second four-byte data portion is CRC (cyclic redundancy check) pertaining to the 1394 header; the third and fourth four-byte data portions are AV headers 1, 2 corresponding to data blocks. The 5th through 124th four-byte data portions are divided into six data blocks. Total number of bytes for the actual data region is, therefore:

80(bytes/block)×6(blocks)=480bytes.

The final 125th four-byte portion is a CRC coding region for the data region.

Figure 5B:
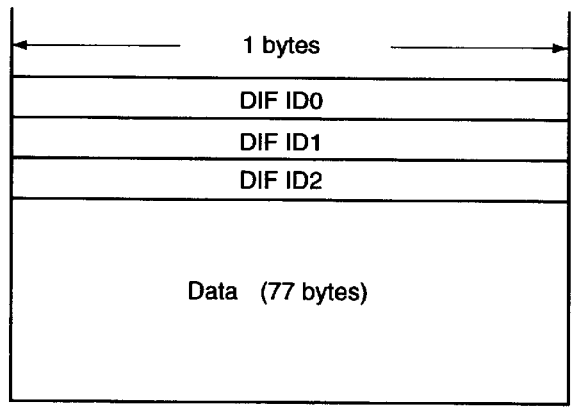
FIG. 5B illustrates a data structure of one block in the transmission packet.

FIG. 5B shows the data structure for one block. As described above, one block is 80 bytes: a Digital Interface (DIF) ID0 area, a DIF ID1 area and a DIF ID2 area each includes one byte, while the remaining 77 bytes are video/audio data-storage area. The type of data stored in the data area changes depending on the block type, as shown in FIG. 4A.

Figure 5C:
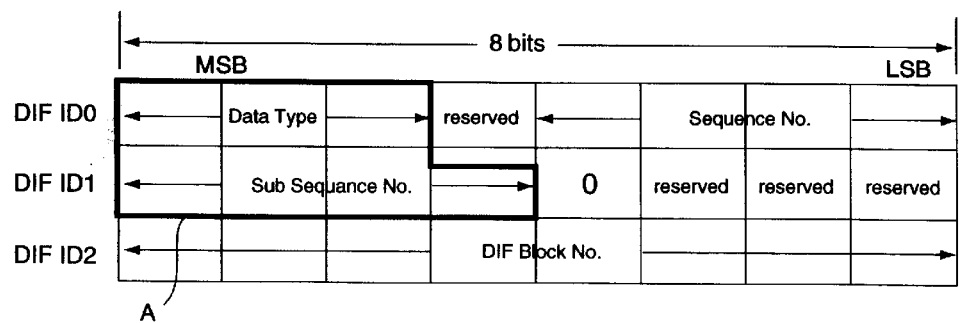
FIG. 5C illustrates selected block portions (DIF ID)

FIG. 5C shows the configuration of the DIF ID0 area, DIF ID1 area and DIF ID2 area. In the DIF ID0 area, the upper 3 bits denote the Data Type region indicating the block data type. The Data Type is defined as shown in FIG. 6A. If the three bits are 000, a header block is indicated. Further, 001 indicates a Sub Code block, 010 indicates a VAUX block, 011 indicates an Audio block and 100 indicates a Video block. Here, 101, 110 and 111 are reserved for future use.

Further according to FIG. 5, the five bits from the fifth upper bit to the LSB of the DIF ID0 area denote the Sequence No. region for indicating a sequence number for the transmission data blocks. The fourth upper bit is reserved.

The upper four bits of the DIF ID1 area designate a Sub-Sequence No. region. Here, the Sub-Sequence No. corresponds to the track number (Track No.) within one frame, as shown in FIG. 6B. In the NTSC standard (SD525), the track number ranges between 0 and 9 to indicate which of the 10 tracks (one frame) the data belongs to. Similarly, in the PAL standard (SD625), for example, the track number ranges between 0 and 11 to show which of the 12 tracks (one frame) the data belongs to. The lower three bits are reserved, and the fifth upper bit is set to 0 in the DIF ID1 area.

The eight bits of the DIF ID2 area designate the DIF Block No. region as shown in FIG. 6C. When the current block is a header block, the DIF Block No. is 0 because there is only one header block. If the current block is a Sub Code block, the first Sub Code block of the two Sub Code blocks within one track is assigned a binary 0, while the following Sub Code block is assigned a binary 1 (as shown in FIG. 6C). If the current block is a VAUX block, 0 to 2 are sequentially assigned within the single track. If the current block is an Audio block, the values 0 to 8 (binary) are sequentially assigned within the track. Similarly, if the current block is a Video block, the values 0 to 134 (binary) are sequentially assigned within the single track. Using this block number assignment, a block position of the same data type within a track can be determined based on the DIF Block No in the DIF ID2 area.

To rearrange image data, based on the image data transmitted using this kind of format, into frames for writing to the frame memory 23, the frame start position is to be detected for data sent successively as the moving image data. Thus, it is necessary to control the data writing operation with respect to the frame memory 23 based on this detection information.

To detect the frame start position, the identification area A of the DIF ID0 and ID1 regions (as shown in FIG. 5C) is extracted from the transmitted data, and the contents of this region are accessed. The identification area A is a region for the Data Type and Sub-Sequence No., as previously stated.

At the time of data transmission, header blocks are added to the beginning of each track, as shown in FIG. 4A. The end of the track data can then be identified for the transmitted data, if the header blocks are detected. Whether or not a block is a header block can be determined by referring to the contents of the Data Type to ascertain whether the Data Type is 000, as shown in FIG. 6A.

Further, 0 is assigned to the first track of the 10 (SD525 format) or 12 (SD625 format) tracks comprising one frame as the Sub-Sequence No., as shown in FIG. 6B. Header blocks of Sub-Sequence No. 0 indicate a frame start position.

At the first track header block for one frame, if 0 for both the Data Type and Sub-Sequence No. is detected from the inputted data, the frame start position is found.

FIGS. 7A and 7B show the configuration of data blocks that are transmitted in packets from the digital VTR 1, with FIG. 7A showing the SD525 format corresponding to the NTSC transmission standard. As described in FIG. 5A, 6 blocks are included in one packet, but in FIG. 7A, 6 blocks of data are shown as one packet per each line. Namely, during the transmission by the digital VTR 1, this can be regarded as handling data for 6 blocks assembled into one. The numbers 0 to 249 assigned to each line in FIG. 7A show packet numbers all pertaining to a single frame. The numbers assigned to each data block correspond to the transmission order for each block type and correspond to the data arrangement order of the data structure previously described in connection with FIG. 4.

For example, 25 packets (packets 0 to 24) contain data corresponding to the first track of the first frame. Namely, 0 is added to the Sub-Sequence No. in the DIF ID1 of each block in these 25 packets, as shown in FIGS. 7A and 7B.

In these packets, six blocks containing header block H0, Sub Code blocks SC0, SC1 and VAUX blocks VA0, VA1, VA2 and VA3 are included in the packet 0. This data arrangement corresponds to the arrangement of block data for the uppermost row of FIG. 4A.

For the following packet 1, as shown in FIGS. 7A and 7B, data for Audio block Au0, Video blocks Vi0, Vi1, Vi2, Vi3 and Vi4 is arranged, wherein this arrangement corresponds to the data arrangement of the second row of FIG. 4A. Concluding with Video blocks Vi129 to Vi134 for packet 24, these are also arranged to conform to the data arrangement of FIG. 4A. The block data for one track portion is then concluded with Vi129–Vi134.

The total for one track portion of block data is then:

$$6(blocks/packet) \times 25(packets) = 150 blocks$$

This can be broken down into one header block, two Sub Code blocks, three VAUX blocks, 135 Video blocks and 9 Audio blocks. The second track (Track 1) within the frame is then transmitted via 25 packets numbered 25 through 49. The configuration of the 150 blocks within these packets is the same as the arrangement of blocks for Track 0 defined by the packets 0 through 24. In contrast to the previous blocks 0–24, however, 1 is assigned as the Sub-Sequence No. of the DIF ID1 for each block 25–49.

Transmission of data for one frame can then be completed by carrying out data transmission from packet 0–249 (that is, the final packet of the tenth track (Track 9)).

FIG. 7B shows the data arrangement of packet blocks in the SD625 format corresponding to the PAL standard. Transmission is also carried out from the leading track of the frame using the block arrangement (one track=25 packets) as described in FIG. 7A. Whereas one frame contains 10 tracks in the SD525 format, in the SD625 format one frame has 12 tracks. Because of this, 300 packets (25 (packets/track)*12 tracks), as shown in FIG. 7B, are necessary to transmit one frame. The blocks of data forming Track 0 to Track 11 can then be transmitted using this packet group. The values 0 to 11 corresponding to the respective track numbers are then set as the Sub-Sequence No.

As described with reference to FIGS. 4A–7B, the transmitted image data is captured, and the image data is extracted in frames by the image capturing board 3. It is, therefore, necessary to determine the frame start position based on the identification area A (Data Type and Sub-Sequence No.) of the DIF ID region, as shown in FIG. 5C.

The processing operation for determining the frame start position from the input data, as carried out by the board controller 21, is described with reference to FIG. 8. As shown in FIG. 8, in step F101, the receiving operation of the image data transmitted in packet units, is carried out. Next, in step F102, the contents of the fifth four-byte data portion (counted from the beginning of the packet, as shown in FIG. 5A) are ascertained. In order to identify the contents of the fifth four-byte data portion from the beginning of the packet, the following information is considered: one track is transmitted as 150 blocks (149 blocks with a header block added) with one packet including a 6 block data region such that one track is completed in 25 packets (150/6=25). The header block positioned at the beginning of the track starts the data block region (the fifth four-byte data portion from the beginning of the packet) every 25 packets. The identification area A, as shown in FIG. 5C, is located in the leading two bytes of each block. The header block identification area A is, therefore, always obtained if the fifth four-byte data portion, from the beginning of the packet, is accessed.

With the data contents thus identified in step F102, it is determined in step F103 whether the Data Type and Track No. of the identification area A both have 0. When this is not the case, the operation returns to step F101, and the process is continued. If, however, in step F103, it is determined that the Data Type and Track No. both have 0, frame start position detection information is obtained in step F104. The board controller 21 can then properly control the writing operation to the frame memory 23 based on this detection result.

5. Format of a Still Image File.

Next, the format of the image file that is generated by capturing the image data transmitted in the aforementioned formats is described with reference to FIGS. 9A–12D, along with the signal processing operation by the computer 2.

FIGS. 9A–10B show the image data formats processed by the image capturing board 3. As shown in FIGS. 9B and 9C, transmission of the image data is carried out in six data units forming one packet. Namely, in the image capturing board 3, packets are partitioned into data units. The Sub Code, VAUX and Video blocks, as shown in FIGS. 9B and 9C, are processed as the buffering unit consisting of 5 blocks.

The header blocks, as shown in FIGS. 5A, 7A and 7B, are only necessary at the time of data transmission from the digital VTR 1, based on the IEEE 1394 standard, and are therefore not needed by the image capturing board 3. That is, the board controller 21 controls the data writing operation in such a way that the 80 bytes of header block are not written to the frame memory 23. To do this, the header block data is separated from other block data groups.

As shown in FIG. 9A, the Video enable pulse indicates the leading block within each buffering unit: the image data is is written to the frame memory 23 (as five blocks (400 bytes) that form a buffering unit) at the falling edge of the Video enable pulse.

In FIG. 9B, a Sub Code block and VAUX block correspond to the group of blocks of the first row in FIG. 4A. The writing operation of the track data then starts from a buffering unit comprising two Sub Code blocks and three VAUX blocks. As shown in FIG. 9C, the Video blocks are subsequently transmitted as buffering units.

Further, the Audio block is transmitted in one block units, as shown in FIGS. 10A and 10B. Each audio block is preceded by an Audio enable pulse showing the start position of the block that is written to the frame memory 23 on the falling edge of the Audio enable pulse.

When the data writing operation is carried out in the above way, 1490 blocks (10 track data portion) are written from the detected frame start position in the case of the SD525 format corresponding to the NTSC standard. Similarly, 1788 blocks (12 track data portion) are written from the frame start position in the case of the SD625 format corresponding to the PAL standard. As a result, data for one still image is completed. The data arranged as 1490/10=149 blocks comprising one track portion (the SD525 format which is NTSC-compatible) or 1788/12=149 blocks (the SD625 format which is PAL-compatible) is written to the frame memory 23 in such a manner as to correspond to the data arrangement shown in FIG. 4A, with the header block removed.

One frame portion of the image data is then obtained by writing ten tracks of data for Track 0 to 9 (or 12 tracks of data for Track 0 to 11). The frame data stored in the frame memory 23 is read at predetermined clock cycles by the board controller 21 and is supplied from the image capturing board 3 to the controller 4 via the bus line 26. Then, this frame data is converted to a still image file according to the description with reference to FIGS. 11A–12D. The still image file is generated under the control of the controller 4 executing the instructions of the image capturing program 4a.

FIG. 11A shows the data structure for an image file containing one still image (one frame). The image file begins with a header area A1 comprising 32 bytes. The header area A1, arranged in four-byte portions, stores various file management information (as described below with reference to FIG. 11B) for use in managing the image files recorded on the recording medium.

Next, a data area A2 is provided for the image data, where data is arranged in two-byte units. The data area A2 contains one frame of the image data. If the format is NTSC-compatible (SD525), 1490 data blocks from 10 tracks are arranged sequentially (Track 0 through Track 9). If the format is PAL-compatible (SD625), 1490 data blocks from 12 tracks are arranged sequentially (Track 0 through Track 11). The size of the image file, therefore, has fixed length: in the SD525 format, it is 32 (bytes)+149 (blocks/track)*80 (bytes/block)*10 (tracks)=119232 bytes; and in the SD625 format, it is 32 (bytes)+149 (blocks/track)*80 (bytes/block) *12 (track)=143072 bytes.

The image data outputted by the digital VTR 1 via the DV terminal 1a undergoes compression processing using a predetermined format. As understood from the above description, the image file contains one frame of compression-processed image data. Consequently, the image file is small, and the recording capacity of the recording medium is efficiently utilized during the image file storage.

FIG. 11B shows the data configuration of the header area A1. The definition of each region of the header area A1 is described with reference to FIGS. 12A–12D.

As shown in FIG. 11B, the 32 byte header area A1 includes, from the top, a file identification area A11, a file version area A12, a detailed format information area A13, a data attribute area A14, a file size area A15, a data size area A16, a data offset area A17 and a Reserved area A18.

Figures 12A, 12B, 12C, 12D:
FIGS. 12A–12D show how the contents of file management information (header) are defined.

The file identification area A11 is represented by four bytes of ASCII code for file identification, and, for example, in the system of the present embodiment is set to "DVF". The file version area A12 defines the file version using four bytes of ASCII code and is, for example, "1.00" in the case of version 1.00. The detailed format information area A13 indicates a format particular to various television formats using three bytes of ASCII code. The definition for this detailed format information is shown in FIG. 12A. Two exemplary codes used in this embodiment are "SD5" for the SD525 format, and "SD6" for the SD625 format. In this embodiment, only the SD525 and SD625 formats have been described. It is understood, of course, that in addition to these two formats, at least four types of other formats may be used: SDL525, SDL625, HD1125 (high definition NTSC-compatible) and HD1250 (high-definition PAL-compatible) shown as "SL5", "SL5", "H11" and "H12", respectively, in FIG. 12A. The data attribute area A14 stores prescribed information showing the attributes relating to the image file, using one data byte. This area is utilized to store 0 or 1 according to the attributes set up for each of the eight bits shown in FIG. 12B for which the required attribute data is defined. The file size area A15 defines the data size of the entire image file, using four bytes of the binary code. The file sizes of SD525 and SD625 are shown in FIG. 12C. As stated above, the image file size is set to 119232 bytes based on the SD525 format, with the 119232 bytes therefore being shown as "00001D1C0" in hexadecimal notation. Further, the data size of the image file has a fixed length of 143072 bytes based on the SD625 format, which is shown as "00022EE0" in the hexadecimal notation. The data size area A16 represents the size of the data area A2 using four bytes (in binary). As shown in FIG. 12D, if the format is SD525, the data size is 119200 bytes (119232−32 =19200) denoted as "0001D1A0" in the hexadecimal notation. If the format is SD625, the data size is 143040 bytes (143072−32 =143040) designated as "00022EC0" in the hexadecimal numbering system. The data offset area A17 defines the offset to the data area A2 from the header area A1 (that is, the end position of the header area from the start of the image file) using four bytes (in binary). In this case, 32 bytes of the header area A1 is "00000020" in the hexadecimal notation. If, for example, it becomes necessary to increase the number of items (areas) in the header area A1 requiring more than 32 bytes, the data offset area A17 may be changed accordingly, thereby providing compatibility with future format changes, etc.

By executing the instructions of the image capturing program 4a, image files based on the captured image data are generated by the controller 4, as described with reference to FIGS. 11A–12D. Namely, with respect to the frame data supplied to the controller 4 from the image capturing board 3, the definitional contents of each area (A11–A18) corresponding to the supplied image type (NTSC standard, PAL standard, etc.) are provided to the header area A1 that is added to the file, and the image file of the structure shown in FIG. 11A is thus generated. An appropriate file name is then given to the image file that is recorded (saved) to the recording medium 6.

6. Generation of the Still Image File.

Figure 13:
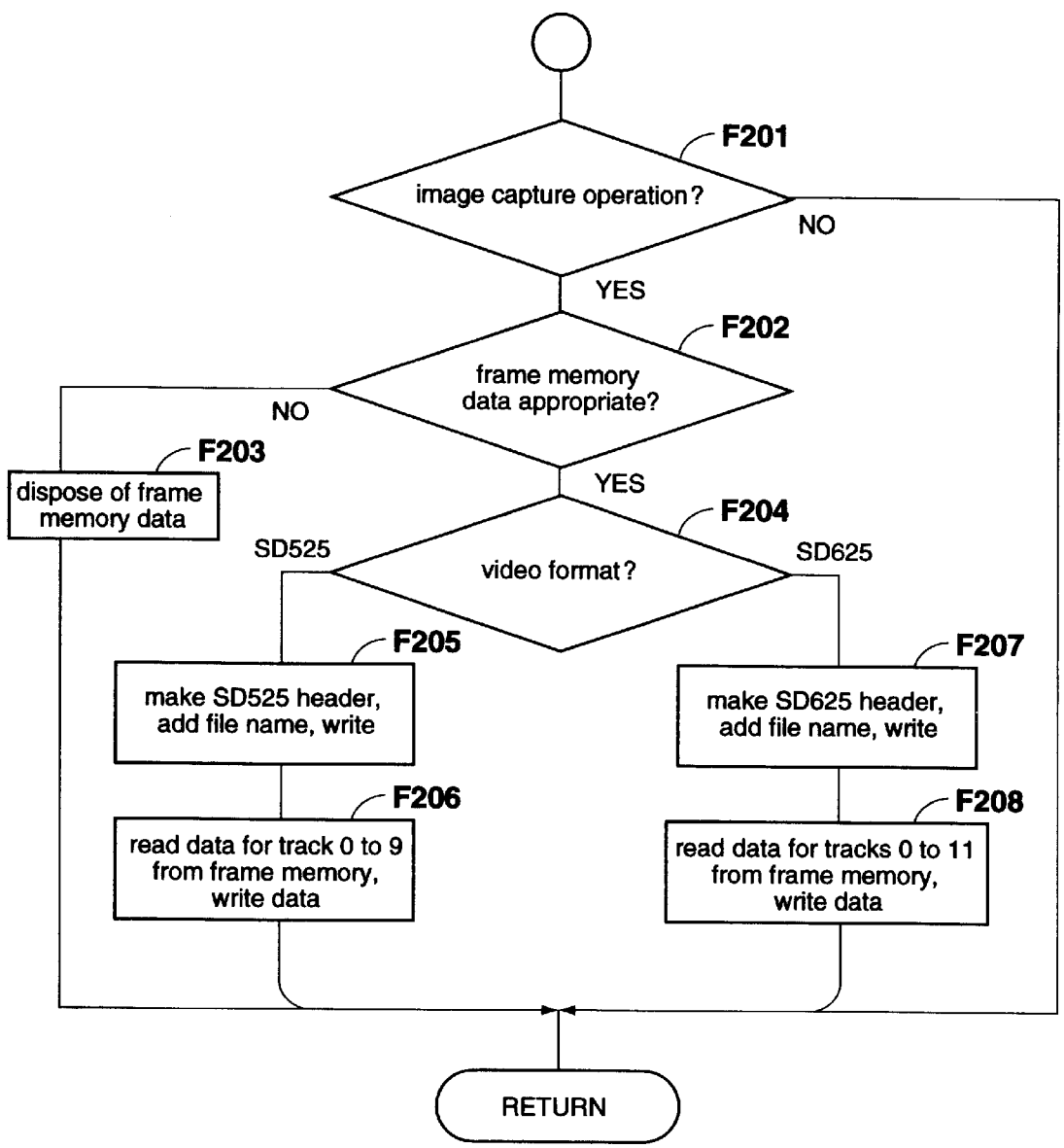
FIG. 13 is a flowchart for generating an image file in accordance with the present invention.

FIG. 13 is a flowchart showing the processing operation in accordance with the image capturing program 4a for generating and saving the image file. The program instructions executed by the controller 4 direct the processing operation to wait for an activation of the key (as described above with reference to FIG. 3) in step F201. During this time, display control for displaying the display screen P (as described above with reference to FIG. 3) is carried out based on a processing operation of another program.

If, in step F201, the key for the image capturing operation is activated, it is determined, in step F202, whether the frame data for the selected image is appropriate/valid. When, for example, the frame data is determined to be invalid due to an error, etc., the frame data is discarded in step F203 without capturing the frame data into memory. In this case, it is indicated on the display screen that the image capturing operation was not performed. Alternatively, high correlation between frames may be indicated. Here, the appropriateness/ inappropriateness of a predetermined number of immediately following frames may be monitored.

When appropriate/valid frame data is obtained in step F202, an operation is carried out, in step F204, to determine the supplied image data format. In this embodiment, the two formats (SD525 corresponding to the NTSC standard and SD625 corresponding to the PAL standard) are used. In step F204, either the SD525 format or the SD625 format is selected. The format determination can be carried out by utilizing the information signal S3 for identifying the NTSC/PAL standard obtained at the image capturing board 3, as previously described.

In step F205, a header (as shown in FIGS. 1 and 12) for the contents corresponding to the SD525 format is generated. An appropriate file name is then given to the header, and under the control of the controller 4, the recording/playback device 5 writes the header information and file name to the recording medium 6. The file name in this embodiment may be, for example, "*****. DVF". Namely, ".DVF" is added as an extension to an arbitrary file name.

Then, the frame data is read from the frame memory 23 in track order, where one frame of data contains 10 tracks of data. As shown in step F206, data contained in 10 tracks is retrieved from the frame memory 23 and is sequentially written to the recording medium 6, following the header written to the recording medium 6 previously in step F205. When the data writing operation for track 9 is finished, i.e. when the frame is completed, an image file of the configuration shown in FIG. 11A is generated and saved on the recording medium 6.

Alternatively, if the SD625 format is determined in step F204, a header for the contents corresponding to the SD625 format is generated in step F207. An appropriate file name is then given to the header, and the recording/playback device 5 writes the header information and file name to the recording medium 6.

Then, the frame data (12 tracks) is read from the frame memory 23. As shown in step F206, data contained in 12 tracks is retrieved from the frame memory 23 and is sequentially written to the recording medium 6, following the header. When the data writing operation for track 11 is finished, thereby completing the frame, an image file is generated and saved on the recording medium 6.

7. Display of an Image Represented by Data in the Still Image File.

Figure 14:
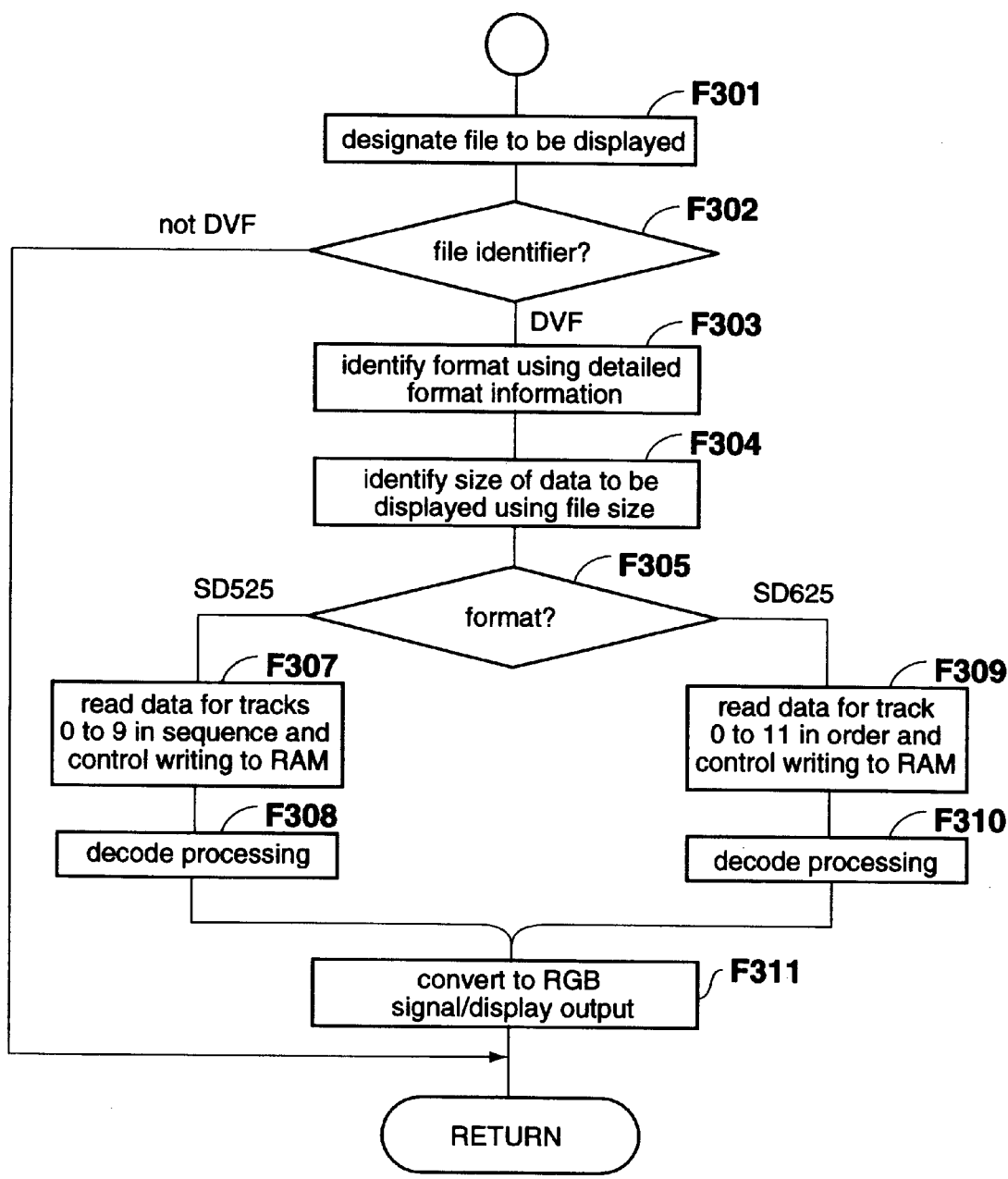
FIG. 14 is a flowchart for displaying the image file in accordance with the present invention.

The operation for displaying the generated image files will now be described with reference to the flowchart of FIG. 14. In addition to the image capturing function as described above, the image capturing program 4a, as executed by the controller 4, also performs display functions for displaying the generated image files. The processing operation shown in FIG. 14 can therefore be carried out in accordance with the image capturing program 4a.

The image capturing program 4a operation is initiated when the user activates the input device 10 of the computer 2 and selects a moving image in order to designate an image file for display as a still image on the monitor 9. In accordance with the executed program instructions, the designated image file is received in step F301, and its header is retrieved from the recording medium 6. Then, in processing the header contents, in step F302, the file identification area A11 (FIG. 11B) is accessed, and the file type is identified. When the file identification is not "DVF" (including those situations where the file cannot be identified), the processing is terminated, and the user is notified, for example, via monitor display, that the designated file data was not processed by the image capturing program.

On the other hand, when the controller 4 determines in step F302 that the file identification is DVF, the detailed format information from area A13 (FIG. 11B) is retrieved in step F303 for identifying the video transmission format (SD525, SD625, etc.). Next, in step F304, the information from the file size area A15 is obtained, and the data size (i.e., the size of the data area A2 with the header area A1 removed from the image file) is determined. In step F305, the controller 4 determines whether the format identified in step F303 is SD525 or SD625. If the format is SD525, in step F307, data is read out (in the order of Track 0 to Track 9) from the recording medium 6 and written to the RAM 4b based on the SD525 format. That is, the data is accumulated for one still image in the RAM 4b, as obtained from the data area A2 of the image file. The data in the image file is frame compressed in accordance with the appropriate recording format of the digital VTR 1.

In step F308, in addition to performing, for example, inverse DCT transformation, etc., on the image data stored in the RAM 4b, the execution of the image capturing program 4a by the controller 4 causes the decoding operation of the image data (expansion processing) to take place. Then, in step F311, the display driver 7 is controlled (based on the data for the still image for which the decoding operation has been performed) to output an RGB signal representing one captured image. Namely, the data in the image file designated by the user is accessed and displayed on the monitor 9.

Alternatively, in step F305, if the format is determined to be SD625, the image data is read from the recording medium 6 based on the SD625 format, and the writing operation to the RAM 4b is carried out in step F309 (i.e. data is read in the order of Track 0 to Track 11 from the recording medium 6). The retrieved data is written sequentially to the RAM 4b until the image data for one still image is accumulated. Then, in step F310, the same decoding operation as in the aforementioned step F308 is performed on the image data stored in the RAM 4b. Similar to the SD525 format file, the designated SD625 format image file is displayed in step F311.

The present invention is by no means limited to the described embodiment, and variations are possible with regards to several aspects. For example, the contents defined in the header of the image file format are by no means limited to the representative header described above with reference to FIGS. 11A–12D. It is understood that the header structure and contents can change to accommodate future developments, etc.

Further, the configuration of the image capturing system of the present invention is by no means limited to the exemplary system shown in FIG. 1: word processors or equipment for game use, etc. can also be used in addition to personal computers.

According to the present invention, a digital image signal supplied from, for example, a digital VTR is extracted in frame units. Headers containing file management information for the obtained image data (in frames) are provided to enable the capturing operation of still images. Thus, still image files are generated by capturing the moving images of the digital signal directly. According to the present invention, the picture quality of the image stored in the image file can be improved when compared with, for example, the case where a digital image signal is temporarily converted into an analog signal for capturing a moving image.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A device operative within a computer for processing digital moving image data, comprising:

image data extracting means for receiving digital moving image data transmitted from a video recorder to said computer in packets formatted in accordance with the IEEE 1394 serial bus standard, determining which one of a plurality of television formats the digital moving image data conforms to, and extracting from the image data a plurality of still images, each of said still images represented by frame data of an image frame; and image file generating means for generating a plurality of data files, each corresponding to one of said still images, each said data file including the extracted frame data and file management data corresponding to the extracted frame data, wherein said file management data includes: detailed format information for indicating said determined television format corresponding to said digital moving image data; file identification information for identifying said data file; file version information for indicating a version of said data file; data attribute information for specifying preselected data attributes; file size information for indicating length of said data file; data size information for indicating length of the extracted frame data in said data file; and data offset information defining an offset between a data area and a header area of said data file.

2. The device according to claim 1, further comprising digital image equipment for recording/reproducing images represented by digital signals according to a preselected format, wherein said digital signals correspond to said digital moving image data.

3. A method for processing digital moving image data, said method comprising the steps of:

receiving, by a computer, digital moving image data transmitted from a video recorder in packets formatted in accordance with the IEEE 1394 serial bus standard;

determining which one of a plurality of television formats the received digital moving image data conforms to;

extracting from said digital moving image data a plurality of still images, each of said still images represented by frame data of an image frame; and generating a plurality of data files, each corresponding to one of said still images, each of said data files including the extracted frame data and file management data corresponding to the extracted frame data, wherein said file management data includes: detailed format information indicating said determined television format corresponding to said digital moving image data; file identification information for identifying said data file; file version information for indicating a version of said data file; data attribute information for specifying preselected data attributes; file size information for indicating length of said data file; data size information for indicating length of the extracted frame data in said data file; and data offset information defining an offset between a data area and a header area of said data file.

4. The method according to claim 3, further comprising recording/reproducing images represented by digital signals according to a preselected format, wherein said digital signals correspond to said digital moving image data.

5. The method according to claim 3, wherein said received digital moving image data is received from a digital VTR.

6. A system for processing digital moving image data, comprising:

an image processing device within a computer, said image processing device including image data extracting means for receiving said digital moving image data transmitted from a video recorder in packets formatted in accordance with the IEEE 1394 serial bus standard, determining which one of a plurality of television formats the digital moving image data conforms to, and extracting a plurality of still images, each represented by frame data of an image frame, from said digital moving image data, and that includes image file generating means for generating a plurality of data files, each corresponding to one of said still images, wherein each of said data files contains the extracted frame data and file management data corresponding to the extracted frame data, said file management data including: detailed format information for indicating said determined television format corresponding to said digital moving image data; file identification information for identifying said data file; file version information for indicating a version of said data file; data attribute information for specifying preselected data attributes; file size information for indicating length of said data file; data size information for indicating length of the extracted frame data in said data file; and data offset information defining an offset between a data area and a header area of said data file; and a recording device for recording said data files.

7. The system according to claim 6, further comprising a personal computer that includes said image processing device and said recording device.

8. The system according to claim 6, further comprising digital image equipment for recording/reproducing images represented by digital signals according to a preselected format, wherein said digital signals correspond to said digital moving image data.

9. The system according to claim 6, wherein said received digital image data has a digital VTR compatible format.

10. An image display device, including a recording medium, for displaying images derived from digital moving image data received from a video recorder, comprising:

data reproducing means for reproducing from said recording medium still image data files containing file management data and frame data that is extracted from said digital moving image data, said file management data including: detailed format information for indicating a television format determined to correspond to said digital moving image data; file identification information for identifying said data file; file version information for indicating a version of said data file; data attribute information for specifying preselected data attributes; file size information for indicating length of said data file; data size information for indicating length of the extracted frame data in said data file; and data offset information defining an offset between a data area and a header area of said data file; and display control means for preselectively decoding data of said still image data files and for displaying images based on the decoded data.

11. The image display device according to claim 10, further comprising a personal computer that includes said data reproducing means and display control means.

12. A recording medium readable by a computer for storing data corresponding to digital moving image data received from a video recorder, comprising:

a plurality of data files representing respective still images, each data file containing file management data and frame data that is extracted by said computer from said digital moving image data, said file management data including; detailed format information for indicating a television format determined to correspond to said digital moving image data; file identification information for identifying said data file; file version information for indicating a version of said data file; data attribute information for specifying preselected data attributes; file size information for indicating length of said data file; data size information for indicating length of the extracted frame data in said data file; and data offset information defining an offset between a data area and a header area of said data file.

13. A method for processing digital moving image data comprising:

extracting still image data from said digital moving image data;

generating an image data file representing one frame of said digital moving image data, said file including an IEEE 1394 standard header, a cyclic redundancy check header, an AV header and packet data comprising a predetermined number of bytes of said still image data;

transmitting said generated image data file in packets formatted in accordance with the IEEEE 1394 serial bus standard to a personal computer having an image capturing means that receives said transmitted packets and extracts frame data representing still images therefrom; and generating, by said computer, a plurality of data files, each corresponding to one of said still images, each of said data files including the extracted frame data and file management data corresponding to the extracted frame data, wherein said file management data includes; detailed format information indicating said determined television format corresponding to said digital moving image data; file identification information for identifying said data file; file version information for indicating a version of said data file; data attribute information for specifying preselected data attributes; file size information for indicating length of said data file; data size information for indicating length of the extracted frame data in said data file; and data offset information defining an offset between a data area and a header area of said data file.

* * * * *